United States Patent [19]
Hirs

[11] Patent Number: 5,874,008
[45] Date of Patent: Feb. 23, 1999

[54] PURIFICATION OF MACHINE TOOL COOLANT VIA TRAMP OIL INJECTION TO EFFECTUATE COALESCENCE OF TARGET CONTAMINANT TRAMP OIL

[76] Inventor: Gene Hirs, 3822 W. Thirteen Mile Rd. Apt. D, Royal Oak, Mich. 48073

[21] Appl. No.: 910,237

[22] Filed: Aug. 13, 1997

[51] Int. Cl.[6] .................................................. B01D 17/04
[52] U.S. Cl. .................... 210/708; 210/712; 210/DIG. 5; 210/521
[58] Field of Search ................................ 210/702, 708, 210/749, 712, 167, 168, 171, 172, DIG. 5, 513, 521

[56] References Cited

U.S. PATENT DOCUMENTS

| | | |
|---|---|---|
| 2,381,760 | 8/1945 | Latham . |
| 3,399,135 | 8/1968 | Conley et al. . |
| 3,529,728 | 9/1970 | Middlebeek et al. .................... 210/522 |
| 3,613,889 | 10/1971 | Reed ........................................ 210/540 |
| 3,925,205 | 12/1975 | Sparham . |
| 4,123,365 | 10/1978 | Middlebeek ............................. 210/521 |
| 4,132,645 | 1/1979 | Bottomley et al. ...................... 210/540 |
| 4,132,651 | 1/1979 | Dejong .................................... 210/522 |
| 4,278,545 | 7/1981 | Batutis et al. ........................... 210/521 |
| 4,333,835 | 6/1982 | Lynch ...................................... 210/305 |
| 4,366,069 | 12/1982 | Dudrey et al. .......................... 210/788 |
| 4,664,802 | 5/1987 | Lee .......................................... 210/522 |
| 4,986,903 | 1/1991 | Canzoneri et al. ........................ 210/90 |
| 5,053,145 | 10/1991 | Ellison ................................. 210/242.3 |
| 5,236,585 | 8/1993 | Fink ......................................... 210/521 |
| 5,302,289 | 4/1994 | McClung et al. ....................... 210/634 |
| 5,326,474 | 7/1994 | Adams et al. ........................... 210/521 |
| 5,405,538 | 4/1995 | Batten ..................................... 210/540 |
| 5,601,705 | 2/1997 | Glasgow ............................. 210/242.3 |

FOREIGN PATENT DOCUMENTS

| | | |
|---|---|---|
| 5248871 | 4/1977 | Japan . |
| 1641384 | 4/1991 | U.S.S.R. . |

*Primary Examiner*—Robert James Popovics
*Attorney, Agent, or Firm*—Lyon, P.C.

[57] ABSTRACT

A method and improvement for extracting free or "tramp" oil from an oil contaminated fluid wherein oil contaminated fluid entering an oil separator is injected with a fraction of free oil. Coalescence of minute oil globules within the inlet stream is significantly enhanced thereby improving oil separation.

2 Claims, 1 Drawing Sheet

PURIFICATION OF MACHINE TOOL COOLANT VIA TRAMP OIL INJECTION TO EFFECTUATE COALESCENCE OF TARGET CONTAMINANT TRAMP OIL

BACKGROUND OF THE INVENTION

The present invention relates to liquid purification systems and particularly to a system for removing free oil and fine solids from fluids utilized in industrial machining operations.

Machining operations generally require the use of coolants to prevent damage to tools due to excessive heat. Typically, a coolant comprises an oil-in-water emulsion wherein water is the continuous phase, oil is the disperse phase, and soap is the emulsifying agent. The emulsion is stabilized by electro-mechanical forces which are weakened or destroyed by contaminants in the form of metallic ions, free oil bacterial action, and fine solids.

The most serious culprit in coolant deterioration is free or "tramp" oil which must be removed to maintain the stability and equilibrium of the emulsion.

SUMMARY OF THE INVENTION

The aforesaid problems are solved, in accordance with a preferred constructed embodiment of the present invention, by an oil injection system utilized in conjunction with an oil separator and/or coalescer. Tramp oil removal can be substantially improved by injecting a fraction of collected tramp oil into the separator inlet stream. The tramp oil injected into the bulk coolant functions as a coalescing agent and as such, actually reduces the total amount of tramp oil in the system.

DETAILED DESCRIPTION OF THE PREFERRED EMBODIMENT

Figure 1:
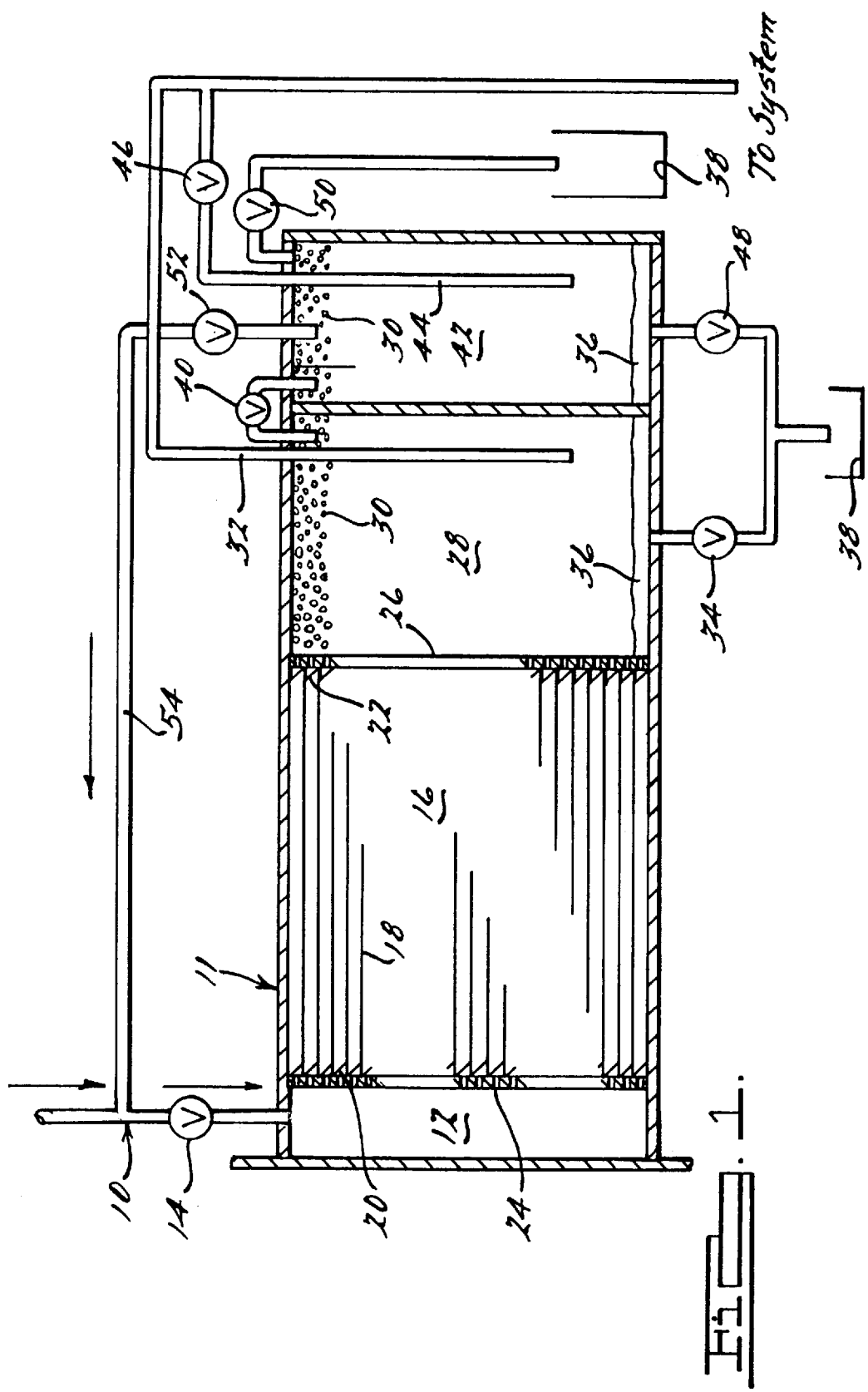
FIG. 1 is a sectional view of a preferred constructed embodiment of the present invention.

Referring to FIG. 1, a system for extracting oil from industrial coolants or washer fluids comprises an inlet conduit 10 and a closed cylindrical tank 11 for the acceptance of bulk coolant under system pressure. Coolant pressure and flow volume to an inlet chamber 12 of the tank 11 are controlled by an adjustable feed valve 14.

The entire coolant flow must pass through an oil extraction element 16 in the tank 11. In the preferred constructed embodiment, the element 16 comprises a plurality of nested horizontally oriented polymeric tubes 18. The tubes 18 are preferably made from high density polyethylene or polypropylene and have an inside diameter of 5/16" and an outside diameter of 3/8". The tubes 18 are provided with angularly oriented end faces 20 and 22 at opposite ends, respectively, to ensure coolant flow into and out of the tubes 18. A perforated input plate 24 and a perforated output plate 26 position the tubes 18. The holes in the perforated plates 24 and 26 are less than 3/8" in diameter to ensure containment of the tubes 18 yet provide for flow of the coolant to a first integrated settling chamber 28.

After passing through the tubes 18, coalesced oil droplets 30 migrate to the top of the chamber 28. A return-to-system conduit 32 extends vertically downwardly into chamber 28 for return of purified fluid to the system. A sludge drain valve 34 is located at the bottom of chamber 28 to facilitate drainage of sludge 36 to a waste tank 38. An oil decant valve 40 and conduit 41 at the top of the chamber 28 are connected to a second stage settling chamber 42 for the transfer of only the coalesced "tramp" oil 30 thereto.

A return-to-system conduit 44 extends vertically downwardly into chamber 42 for removal of purified fluid to the coolant system through a valve 46. A sludge drain valve 48 is located at the bottom of chamber 42 to facilitate drainage of sludge therefrom. A coalesced "tramp" oil decant valve 50 at the top of the chamber 42 controls the flow of "tramp" oil to the waste oil tank 38.

In accordance with the present invention, an injection valve 52, also fluidly communicating with chamber 42, controls the flow of "tramp" oil into and through an injection conduit 54. Free oil passing through conduit 54 is thus directed into inlet conduit 10 thereby enhancing oil separation.

In operation, contaminated coolant flows through inlet conduit 10 into supply chamber 12 of the tank 11 thence through the horizontal tubes 18 and thence through settling chambers 28 and 42. Most of the tramp oil separated from the bulk coolant is routed to waste via waste oil conduit 50. A fraction of the tramp oil, however, is diverted through injection valve 52 and injection conduit 54 and then into conduit 10 for injection into the inlet contaminated oil stream.

Table 1, as shown below, compares the efficiency of an oil separator with and without tramp oil injection.

TABLE 1

Oil Separator Efficiency With .1% (1000 ppm) Tramp Oil Injection.

| Incoming Oil Contamination (ppm) | Exit Quality Without Tramp Oil Addition (ppm) | Exit Quality With Tramp Oil Addition (ppm) | % Efficiency Improvement |
|---|---|---|---|
| 982 | 767 | 712 | 5.2 |
| 870 | 690 | 640 | 6.9 |
| 743 | 635 | 570 | 7.9 |
| 518 | 450 | 406 | 9.7 |
| 407 | 372 | 327 | 12.1 |

Most conventional separators operate by separation of tramp oil from the bulk fluid. After separation, the tramp oil is then decanted to waste. In contrast, in accordance with the present invention, tramp oil is reintroduced into the contaminated inlet stream in relatively small amounts. The results in Table 1 were generated by passing respective samples of equal volume through 5 micron hydrophobic membrane filters. As shown, total tramp oil within the fluid exiting the oil separator is actually reduced by adding small amounts of tramp oil into the inlet stream.

It is believed that the injected oil functions as a coalescing agent and provides a greater oil interface for oil globule attraction thereto. Because tramp oil globules within the bulk fluid have an affinity for other tramp oil globules therein, separation efficiency is increased.

It will be understood that the invention should not be construed as limited to coolant applications, but is meant to encompass any machining fluid, for example a washer fluid used in industrial processes, or any oil contaminated bulk fluid. Furthermore, the foregoing description of the preferred embodiment of the present invention is for illustrative purposes only, and the various structural and operational features herein disclosed are susceptible to a number of modifications, none of which departs from the spirit and scope of the present invention as defined in the appended claims.

I claim:

1. A method of separating free oil from free oil-contaminated bulk fluid comprising the steps of:

directing free oil-contaminated bulk fluid into an oil separator;

injecting free oil into the free oil-contaminated bulk fluid; and separating free oil from the injected fluid.

2. The method of claim 1 whereby the contaminated fluid is injected with approximately 1000 parts per million of free oil.

* * * * *